Figure 2:
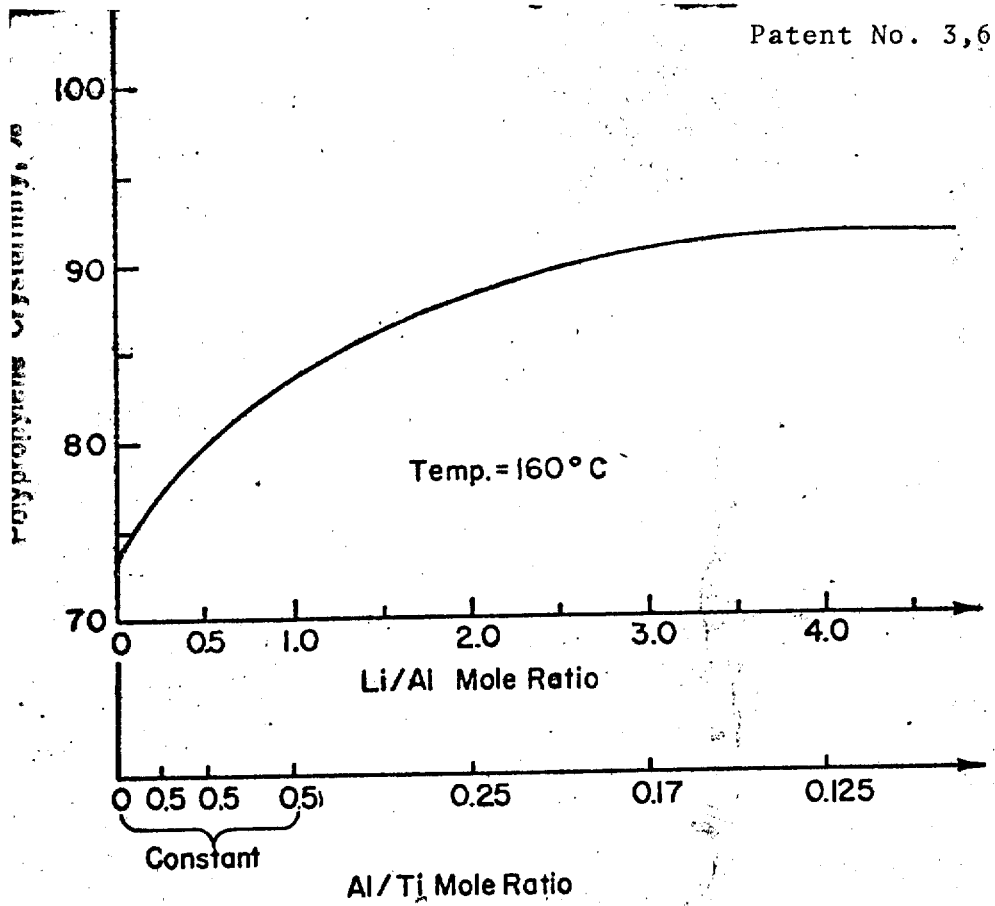

United States Patent
Hagemeyer, Jr. et al.

[15] 3,679,775
[45] July 25, 1972

[54] OLEFIN POLYMERIZATION PROCESS AND CATALYST

[72] Inventors: Hugh J. Hagemeyer, Jr.; Vernon K. Park, both of Longview, Tex.

[73] Assignee: Eastman Kodak Company, Rochester, N.Y.

[22] Filed: April 3, 1968

[21] Appl. No.: 718,337

Related U.S. Application Data

[63] Continuation-in-part of Ser. No. 597,481, Nov. 28, 1966, abandoned, which is a continuation of Ser. No. 464,580, June 16, 1965, abandoned, which is a continuation of Ser. No. 146,004, Oct. 18, 1961, abandoned.

[52] U.S. Cl. ............260/878 B, 252/429 C, 260/88.2, 260/93.7, 260/94.9 E
[51] Int. Cl. .............................C08f 1/56, C08f 3/10
[58] Field of Search .............260/93.7, 94.9 E, 878, 88.2

[56] References Cited

UNITED STATES PATENTS

| | | | |
|---|---|---|---|
| 3,600,463 | 8/1971 | Hagemeger et al. | 260/93.7 |
| 3,261,820 | 7/1966 | Natta et al. | 260/93.5 |
| 3,403,142 | 9/1968 | Craven | 260/94.9 |

FOREIGN PATENTS OR APPLICATIONS

| | | |
|---|---|---|
| 1,337,624 | 8/1963 | France |
| 989,724 | 4/1965 | Great Britain |
| 802,633 | 10/1958 | Great Britain |

OTHER PUBLICATIONS

Coates, Organo-Metallic Compounds, 2nd Ed. (1960), page 139.

Natta et al.; Advances in Catalysis, Vol. XI, Academic Press, Inc., N.Y. and London, 1959, pages 9–11.

*Primary Examiner*—Joseph L. Schofer
*Assistant Examiner*—Edward J. Smith
*Attorney*—William T. French and Clyde L. Tootle

[57] ABSTRACT

Process for polymerizing alpha-olefins employing a catalyst comprising organopolylithiumalumaluminum compound prepared by reacting lithium compounds selected from the group consisting of lithium hydride and lithium alkyl with at least one aluminum compound selected from the group consisting of aluminum trialkyl and dialkyl aluminum hydride, an alkyl compound selected from the group consisting of lithium alkyl, aluminum trialkyl and dialkyl aluminum hydride and the alpha form of $TiCl_3$. This combination provides a catalyst for commercial processes which can be operated at temperatures above 140° C. over extended periods of time.

15 Claims, No Drawings

OLEFIN POLYMERIZATION PROCESS AND CATALYST

This application is a continuation-in-part of application Ser. No. 597,481, filed Nov. 28, 1966, now abandoned which is a continuation of Ser. No. 464,580 filed June 16, 1965, now abandoned which is a continuation of application Ser. No. 146,004, filed Oct. 18, 1961 now abandoned.

This invention relates to the polymerization of alpha-olefins and catalyst mixtures useful for this purpose. More particularly, this invention relates to the catalytic polymerization to form solid, highly crystalline polymers containing alpha-monoolefins having at least three carbon atoms using a catalyst mixture that a unique in producing polymers having higher molecular weight and crystallinity at high temperatures.

It is well known that in the catalytic polymerization of alpha-olefins, it is possible to produce polymers having widely different properties and physical characteristics depending, to a large extent, upon the catalyst system and the process conditions. Much of the work in this field has been directed to the development of catalysts and catalytic processes that are capable of forming highly crystalline poly-alpha-olefins, i.e., those having crystallinities of at least 70 percent, (i.e., insoluble in boiling hexane) since it has been shown that these highly crystalline polymers have greatly improved properties over the amorphous poly-alpha-olefins. For example, amorphous polypropylene that has been formed as a solid by some of the methods known in the art has a softening point of only 80° C. and a density of 0.85 while solid, highly crystalline polypropylene has a melting point of at least 165° C. and a density greater than 0.90. Similarly, crystalline polybutene-1 has a melting point of 120° C. and a density of 0.91, whereas the amorphous polybutene-1 has a softening point of about 60° C. and a density of 0.87. This same increase in density and melting point is observed with other alpha-olefins in solid polymeric form including both the straight and branched chain alpha-monoolefins. Thus, crystalline poly(3-methylbutene-1) has a melting point in excess of 240° C., crystalline poly(4-methylpentene-1) has a melting point in excess of 205° C., crystalline poly(4-methyl-hexene-1) has a melting point of about 190° C., crystalline poly(5-methylhexene-1) has a melting point of the order of 130° C. and crystalline poly(4,4-dimethylpentene-1) has a melting point in excess of 300° C. It is apparent, therefore, that polymerization processes and catalysts that will form highly crystalline polyolefins, i.e., those having crystallinities of at least 70 percent, are of considerable importance in the art.

A number of methods have been proposed for preparing solid, highly crystalline poly-alpha-olefins including, for example, the polymerization of ethylene and higher alpha-olefins such as propylene and butene-1 to highly crystalline polymers in the presence of inert diluents at temperatures of 100° C. or below and at relatively low pressures. Catalyst mixtures that have been employed in these so called slurry processes comprise an aluminum compound, e.g., an aluminum trialkyl, a dialkyl aluminum halide, an alkyl aluminum sesquihalide and a cocatalyst, e. g., a transition metal halide. However, when catalysts of this type are used at temperatures above 100° C., the transition metal halide is rapidly reduced and an inactive catalyst results. These prior art catalysts, therefore, cannot be used for polymerization at elevated temperatures which would permit formation of the polymer near or above its melting point without fouling of the catalyst or inactivation of the system. Furthermore, elevated temperatures would also obviate the difficulties inherent in many of the lower temperature processes wherein the formation of the polymer causes a deposit on the catalyst sufficient to cause inactivation or, where the polymerization is carried out in a solvent medium, the polymerization mixture becomes too viscous for adequate agitation before the catalyst is exhausted with a resultant loss in the economy of the process and a necessity for removing large amounts of residual catalyst from the resulting polymer.

Another advantage of higher temperatures over lower temperatures in the polymerization of alpha-olefins is that the induction time for a catalyst decreases as the temperatures rise. Thus, Natta et al give data in La Chimica e L'Industria 39, paragraph 12(No. 12) 1,002–1,012 (1957), specifically in FIG. 5, which demonstrates that an increase in the temperature from 32° to 70° C. shortens the time required to approach a constant rate of polymerization from 7 hours to 2 hours. At temperatures of at least 140° C. and preferably 150° C. this induction period is substantially eliminated, provided, of course, that the catalyst is not inactivated at these high temperatures. It is also significant that, Natta, in the same series of articles, points out that catalysts such as aluminum alkyl and titanium trichloride give lower crystallinities at higher temperatures.

Still another significant advantage of high temperature alpha-olefin solution polymerization processes over the low temperature slurry processes is that, in the former, the catalyst concentrations are generally so low that it is possible to simply filter the polymer solution to obtain products with residual ash contents low enough to be satisfactory for most commercial uses. In contrast, it is exceedingly difficult to separate a solid by chemical reaction and extraction which must be used in the low temperature slurry processes. Furthermore, separation of a catalyst by filtration and polymer recovery by melt concentration in these high temperature processes avoids contamination of recycle olefin and solvent streams with polar solvents such as alcohols which are employed in the low temperature slurry processes to wash out the catalyst from the polymer. Polar solvents such as alcohols are, of course, catalyst poisons, and, therefore, the recycle olefin and solvent streams in a slurry process must be vigorously purified to remove these polar contaminants. In a high temperature solution process, however, the olefin and solvent streams can be merely filtered, concentrated and recycled directly to the synthesis step without extensive purification treatments which are necessary in slurry processes.

But for a few noteworthy exceptions, the state of the art has not advanced sufficiently to permit the catalystic preparation of solid, highly crystalline poly-alpha-olefins at temperatures above 140° C. It is evident, from the discussion hereinabove, that the state of the art will be greatly enhanced by providing such a catalytic process. Likewise, a noteworthy contribution to the art will be a catalytic process employing a catalyst mixture that is effective in a commercial operation at elevated temperatures to form solid, high molecular weight poly-alpha-olefins having crystallinities of at least 70 percent.

It is an object of this invention to provide catalyst mixtures capable of providing a high temperature process that can be used to produce solid, high molecular weight hydrocarbon polymers having excellent crystallinity.

Another object of this invention is to provide a novel alpha-olefin polymerization process that employs a catalytic mixture of three components for the preparation of highly crystalline poly-alpha-olefins at high temperature.

Another object of the invention is to facilitate the commercial production of highly crystalline solid poly-alpha-olefins whereby hydrocarbon polymers of very high softening points, high tensile characteristics, good moldability, improved stiffness and film forming properties are readily obtained.

Another and further object of the present invention is to provide a catalyst system having a sustained catalytic activity for the preparation of highly crystalline high molecular weight poly-alpha-olefins at high temperatures.

A further object of this invention is to provide a catalyst system for polymerization of an alpha-monoolefin at temperatures above 140° C.

In accordance with this invention, it has been found that a particularly effective catalyst for polymerizing alpha-olefins, i.e., those containing at least three carbon atoms, either alone or in admixture with not more than 20 percent ethylene, at temperatures above 140° C. to form solid, high molecular weight polymer having a crystallinity of at least 70 percent is a catalyst mixture comprising (1) an organopolylithiumaluminum compound prepared by reacting lithium compounds selected from the group consisting of lithium hydride and lithium alkyl with at least one aluminum compound selected from the group consisting of aluminum trialkyl and dialkyl aluminum hydride, (2) an alkyl compound selected from the group consisting of lithium alkyl, aluminum trialkyl and dialkyl aluminum hydride and (3) the alpha form of titanium trichloride. This novel catalyst combination is extremely effective for the polymerization of alpha-olefins containing at least three carbon atoms, and particularly the straight and branched chain aliphatic alpha-monoolefins having at least one

group and containing three to 10 carbon atoms alone or with up to 20 percent ethylene, to solid, high molecular weight, highly crystalline polymers in excellent yield by commercially feasible methods at temperatures above 140° C. over sustained periods of time.

As heretofore noted, one component of the catalyst mixture is an organopolylithiumaluminum compound. The organopolylithiumaluminum compound is prepared by reacting lithium hydride or lithium alkyl with an aluminum trialkyl or dialkyl aluminum hydride. In forming the organopolylithiumaluminum compound employed in the process of this invention the lithium hydride or lithium alkyl, such as lithium butyl, is reacted with aluminum trialkyl, such as triethyl aluminum, or dialkyl aluminum hydride, such as diisobutyl aluminum hydride, in a molar ratio in the range of about 1:1 to about 10:1, and preferably in the range of about 1.5:1 to about 4:1, to form the organopolylithiumaluminum compound. Inert organic liquid media which can be used in the formation of the organopolylithiumaluminum compound include any of the aliphatic alkanes or cycloalkanes such as pentane, hexane, heptane, isooctane or cyclohexane or the high molecular weight liquid paraffins or mixtures of paraffins which are liquid at the reaction temperature. In addition, aromatic hydrocarbons such as benzene, toluene and xylene can be employed with good results. The compound is conveniently formed at temperatures in the range of about 20° C. to about 100° C. with temperatures in the range of about 25° C. to about 100° C. being preferred. The time of reaction will depend upon the temperature employed although periods of about 1 to about 12 hours, and preferably no more than 48 hours generally give good results. The organopolylithiumaluminum compound can be isolated from the resulting reaction mixture by any of the conventional isolation techniques such as filtration, centrifugation and the like. However, it is convenient to wash the organopolylithiumaluminum compound several times with fresh solvent before mixing with the transition metal halide to form the active catalyst mixture.

The aluminum alkyls that can be reacted with the lithium hydride or lithium alkyl to form the organopolylithiumaluminum compound component of the catalyst mixture according to this invention are well known in the art and can be represented by the formula $AlR_3$ or $AlR_2H$, wherein each R is an alkyl radical desirably containing one to 12 carbon atoms, and preferably a lower alkyl radical containing one to eight carbon atoms. Suitable alkyl radicals include methyl, ethyl, propyl, butyl, isobutyl, octyl, decyl, dodecyl and the like. Thus, aluminum alkyls that are employed to form the solid isolatable polyorganolithiumaluminum compound forming one component of the catalyst mixture of this invention include aluminum trimethyl, aluminum triethyl, aluminum triisobutyl, methyl aluminum diethyl, aluminum tridodecyl, aluminum trioctyl, aluminum tridocyl, diisobutyl aluminum hydride, diethyl aluminum hydride and the like.

The second component of the catalyst is an alkyl compound selected from the group consisting of lithium alkyl, aluminum trialkyl and dialkyl aluminum hydride, noted hereinbefore employed to form the organopolylithiumaluminum compound catalyst component.

The third component of the catalyst is the alpha form of titanium trichloride. The alpha form of titanium trichloride is well known in the art and is prepared by the hydrogen reduction of $TiCl_4$.

The use of the organopolylithiumaluminum compound resulting from the reaction of lithium hydride or lithium alkyl with an aluminum trialkyl or dialkyl aluminum hydride according to the process of this invention represents a significant advance in the catalytic polymerization of higher alpha-olefins to solid, high molecular weight, highly crystalline polymers. Thus, lithium hydride, or lithium alkyl cannot be used with the alpha form of titanium trichloride to produce an active catalyst mixture for the polymerization of higher alpha-olefins, and aluminum trialkyl inactivate transition metal halides by over-reduction at temperatures in excess of 100° C. In contrast, the product of lithium hydride or lithium alkyl and an aluminum trialkyl or dialkyl aluminum hydride as described herein, when used with the alpha form of titanium trichloride forms an extremely effective catalyst mixture for the polymerization of higher alpha-olefins to solid, high molecular weight, highly crystalline polymer. However, without the third component the control over the inherent viscosity and hexane index of the polymer produced is limited. For example, if LiH is reacted with triethyl aluminum in mineral spirits and the solid organopolylithiumaluminum compound separated from the mixture, and a catalyst mixture is formed with this solid organopolylithiumaliminum compound and the alpha form of titanium trichloride and propylene polymerized at 160° C., polypropylene is formed having an inherent viscosity of 2.1 ± 0.3 and a hexene index of 79 ± 3. The mole ratio of LiH to triethyl aluminum can be varied over wide ranges without varying the polymer properties. Some control over inherent viscosity and hexane index can be obtained by varying the aluminum to titanium ratio, however, this is not sufficient for control of commercial processes.

It should also be noted that the maximum Al to Ti Ratio that can be utilized with these catalysts is 1:1 since higher ratios adversely effect the activity. By adding Component (2) to the catalyst system the I.V. and hexane index of the polymer can be controlled such that the entire range of commercially useful polymers can be produced. Also, the maximum I.V. and hexane index attainable is increased. The particular Component (2) used and the amount required will depend on the results desired and the compounds used to form Component (1). However, for all Components (1), if an increase in I.V. and hexane index is desired, then a lithium alkyl is added, and, if a decrease is desired, aluminum alkyl and/or dialkyl aluminum hydride is added. The catalyst mixture of the present invention therefore, provides a unique method for controlling the inherent viscosity and hexane index of polymers formed in a polymerization reaction.

In one particular embodiment of this invention, the organopolylithiumaluminum compound is prepared by reacting lithium hydride or a lithium alkyl with an aluminum alkyl or dialkyl aluminum hydride. The reaction can be carried out in a hydrocarbon solvent such as mineral spirits and under an inert atmosphere. When lithium hydride is used, the reaction is normally carried out at slightly elevated temperatures, i.e., 50°–100° C. However, when lithium alkyl is used, ambient temperature is sufficient for satisfactory reaction times. The organopolylithiumaluminum compound formed can be separated from the liquid by filtration, centrifugation, or other means known to those skilled in the art. Additional lithium alkyl, aluminum alkyl or dialkyl aluminum hydride preferably dissolved in a hydrocarbon solvent such as mineral spirits can be added to the solid organopolylithiumaluminum compound and alpha-type $TiCl_3$ is added to this combination to produce the catalysts of this invention.

In one preferred method of forming the catalyst of this invention, it is not necessary to separate the organopolylithiumaluminum compound formed in the hydrocarbon solvent. For example, lithium hydride can be reacted with aluminum triethyl in mineral spirits to form organopolylithiumaluminum compound-mineral spirits slurry. To this slurry, depending on the results desired, can be added lithium alkyl, dialkyl aluminum hydride, or aluminum trialkyl. This mixture is then combined with alpha-type $TiCl_3$ to produce the catalysts of this invention.

In another preferred method, the organopolylithiumaluminum compound can be formed in situ in a reactor by adding lithium alkyl and trialkyl aluminum to the reactor and forming the organopolylithiumaliminum compound in situ using a surplus of lithium alkyl or aluminum trialkyl. To this mixture is added the alpha form of titanium trichloride to form the catalyst mixture.

The catalysts prepared by either of the above methods give essentially identical results and the method of preparation is merely a matter of convenience. The mole ratios of lithium to aluminum and aluminum to titanium must be controlled within certain limits to obtain the preferred polymerization results of this invention. The effective lithium to aluminum mole ratio can vary from 0.25 to 1 to 4 to 1, preferably from 1 to 1 to 2 to 1. This effective ratio can be calculated as follows:

1. When LiH is used to form the solid organopolylithiumaluminum compound and the total mixture is used without separating the solid:

$$\frac{\text{Moles LiH/4}^a + \text{moles LiR}}{\text{Moles AlR}_3 \text{ and/or moles R}_2\text{AlH}} = \text{effective Li/Al mole ratio}$$

a If the value of moles LiH/4 is greater than 1, use 1 in the calculation.

2. When LiR is used to form the solid organopolylithiumaluminum compound and the total mixture is used without separating the solid:

$$\frac{\text{Moles LiR}}{\text{Moles AlR}_3 \text{ and/or moles R}_2\text{AlH}} = \text{Effective Li/Al mole ratio}$$

3. When LiH or LiR is used to form the solid organopolylithiumaluminum compound and the solid is separated, a fixed Li/Al mole ratio is obtained. The effective Li/Al mole ratio in the catalyst system can vary by the addition of LiR, $AlR_3$ or $R_2AlH$ and is determined as follows:

When LiH is used to form solid $$\frac{1 + \text{Moles LiR added}}{1 + \text{moles AlR}^3 \text{ added} + \text{moles R}_2\text{AlH added}} = \text{Effective Li/Al mole ratio}$$

When LiR is used to form solid $$\frac{2 + \text{moles LiR added}}{1 + \text{moles AlR}_3 \text{ added} + \text{moles R}_2\text{AlH added}} = \text{Effective Li/Al mole ratio}$$

The aluminum to titanium mole ratio can vary from 0.1:1 to 1:1, preferably 0.25:1 to 0.50:1 and is based on the total aluminum present in the catalyst mixture.

The lithium to titanium mole ratio can vary from 0.25:1 to 1:1.

The catalyst mixtures employed in the process of this invention are extremely effective at elevated temperatures. Thus, the polymerization reaction can be carried out at temperatures in the range of about 140° C. to about 300° C., and preferably at temperatures in the range of about 150° C. to about 250° C. At these high temperatures the catalyst is employed in concentrations of about 0.01 to about 1 percent, by weight, based on the monomer being polymerized, with preferred catalyst concentrations being in the range of about 0.02 to about 0.1 percent, by weight. Lower catalyst concentrations can be employed, but generally the rate of polymer formation is quite slow and at higher catalyst concentrations considerable difficulty is encountered in controlling the reaction. The concentration of the catalyst employed will generally depend upon the desired method of operation, for example, low catalyst concentrations would be used where high polymer to catalyst yields are desired. On the other hand, higher catalyst concentrations are employed where high polymer yields per unit of reactor space are desired. The polymers formed at the high temperatures employed in this invention are highly crystalline, i.e., exhibit crystallinities in excess of 70, 80 or even 90 percent. The crystallinities of the products can be determined by refluxing the polymer in hexane, the portion of the solid polymer insoluble in refluxing hexane being the crystalline portion.

The polymerization in accordance with this invention is generally carried out at pressures in the range of about atmospheric to about 2,000 atmospheres. Usually pressures greater than 15 atmospheres, are employed to obtain commercially satisfactory rates. Higher pressures are generally required for the polymerization in the absence of a solvent. In the absence of a solvent, the monomer dissolved in the polymer should generally be from 1 to 4 times the weight of the polymer in order to obtain viscosities that can be handled satisfactorily in the reactor space. Increasing the quantities of dissolved monomer lowers the viscosity in the reactor space which allows for better heat transfer and good catalyst distribution. The pressure in the polymerization can be achieved in any desirable manner, a convenient method being to pressure the system with the monomer or monomers being polymerized.

The polymerization reaction can be carried out in the presence or absence of an inert organic liquid vehicle. When the polymerization is carried out in the presence of an inert organic liquid vehicle, this vehicle can be any of the inert organic liquids which contain no combined oxygen and which are free of water, alcohol, ether or other compounds containing oxygen or compounds containing unsaturation. The organic vehicle employed can be an aliphatic alkane or cycloalkane such as pentane, hexane, heptane or cyclohexane, or a high molecular weight liquid paraffin or mixture of paraffins which are liquid at the reaction temperature, or an aromatic hydrocarbon such as benzene, toluene, xylene or the like.

A petroleum fraction of suitable boiling range such as odorless mineral spirits will give particularly good results. In addition, good results can be obtained when the polymerization is carried out in the presence of a dense gas such as highly compressed propylene by operating at elevated pressures.

This invention can be further illustrated by the following examples or preferred embodiments thereof although it will be understood that these examples are included merely for purposes of illustration and are not intended to limit the scope of the invention unless otherwise specifically indicated.

Example 1

As already indicated, the solid organopolylithiumaluminum compound formed by the reaction of lithium hydride and an aluminum trialkyl forms one catalyst component for polymerizing alpha-olefins to solid, high molecular weight, highly crystalline polymers at high temperatures. The organopolylithiumaluminum compound can be prepared by adding a solution of 2.9 g. of aluminum triethyl (0.025 mole) in 16 ml. of heptane to 0.4 g. of finely dispersed lithium hydride (0.05 mole) in 50 ml. of mineral spirits. The mixture is stirred for 2 hours at 50° C. under a dry nitrogen atmosphere, resulting in a white crystalline solid. To this white crystalline solid slurry is added 7.7 g. of the alpha form of titanium trichloride (0.05 mole) to form an active catalyst mixture. The catalyst mixture is charged to a dry 2-liter stirred stainless steel autoclave with 850 ml. of mineral spirits. The autoclave is sealed, purged with propylene and heated to 150° C. Propylene is pumped into the autoclave to 1,000 psig. and with agitation the temperature rises to 172° C. with a decrease in pressure. Additional propylene is added to the reactor to maintain a pressure of 100 psig. The reaction is run for 1 hour and the autoclave is cooled and vented. The yield is 395 g. of polypropylene having an inherent viscosity (determined in tetralin at 145° C.) of 2.07 and a crystallinity of 92.6 percent (percent non-extractable with normal hexane at reflux).

The invention is further illustrated in this, and the following examples by the polymerization of propylene which is, at present, the most readily available of the higher alpha-olefin and is, therefore, of the greatest immediate commercial importance. The invention is applicable, however, to any of the other alpha-olefins as defined herein, and it has been found that large amounts of solid, high molecular weight, highly crystalline polymers are prepared by polymerizing such diverse materials as butene-1, pentene-1, 3-methyl-1-butene, 4-methyl-1-pentene, 4-methyl-1-hexane, 5-methyl-1-hexene and 4,4'-dimethyl 1-pentene using the process described herein.

Example 2

About 230 ml. of a 25 percent solution of aluminum triethyl equivalent to 41.3 g. of aluminum triethyl (0.36 mole) is added to 2.9 g. of lithium hydride (0.36 mole) in 50 ml. of mineral spirits. The mixture is stirred at 60° C. for 2 hours under a nitrogen atmosphere. The resultant solid crystalline organopolylithiumaluminum compound, together with 56 g. of the alpha form of titanium trichloride (0.36 mole) is charged to an 82-gallon stirred reactor containing 40 gallons of mineral spirits. Propylene is pumped into the reactor to 450 psig. and agitation is begun. The polymerization reaction is controlled at 150° C. and allowed to continue for 12 hours. The concentration of the polymer (based on solvent) in the reactor is 18.0 percent. At the conclusion of the reaction the catalyst is removed by filtration and the filtered polymeric solution is concentrated. The total yield of polymer is 65 pounds of polypropylene or 287 pounds per pound of catalyst. The polypropylene has an inherent viscosity (determined in tetralin at 145° C.) of 1.69 and a crystallinity of 87.5 percent.

Example 3

A crystalline solid organopoly lithiumaluminum compound is formed by adding 10 g. of aluminum triisobutyl (0.05 mole) to 0.4 g. of lithium hydride (0.05 mole) in 100 ml. of mineral spirits and stirring the mixture at 60° C. for 2 hours. To the slurry is added 7.7 g. of the alpha form of titanium trichloride (0.05 mole) to form an active catalyst mixture. The catalyst mixture is diluted to 900 ml. with mineral spirits and charged to a 2-liter stirred autoclave. Propylene is pumped into the reactor to 1,000 psig. at 170° C. At the end of an hour the autoclave is cooled and vented and the yield of polypropylene is 320 g. The inherent viscosity (determined in tetralin at 145° C.) of the polymer is 1.75 and the crystallinity is 91.0 percent.

Example 4

To a 500 ml. three-necked flask fitted with a stirrer and thermowell is added 3.2 g. of finely divided lithium hydride (0.4 mole), 50 ml. of mineral spirits and 34.4 ml. of a 25 percent solution of aluminum triethyl equivalent to 6.2 g. of aluminum triethyl (0.54 mole) in a nitrogen filled dry box. The mixture is stirred under a nitrogen atmosphere for 4 hours at 60° C. The slurry which results is charged together with 83 g. of the alpha form of titanium trichloride (0.54 mole) to an 82-gallon stirred reactor containing 40 gallons of odorless mineral spirits. Propylene is pumped into the reactor to 400 psig. and agitation is begun. The polymerization is controlled at 156° C. and allowed to continue for 12 hours. The polymer solution is filtered, concentrated and the polymer extruded and pelletized. A yield of 207 pounds of solid polypropylene per pound of catalyst is produced having a crystallinity of 85 percent (hexane extraction) and an inherent viscosity (determined in tetralin at 145° C.) of 1.86.

Example 5

The lithium hydride-aluminum triethyl organopoly lithiumaluminum compound is formed by adding 3.2 g. (0.4 mole) of lithium hydride to 12.3 g. of aluminum triethyl (0.11 mole) and stirred at 50° C. for 1 hour. This compound, together with 83 g. of the alpha form of titanium trichloride (0.54 mole) constitutes a 0.75/0.2/1.0 molar ratio of Li/Al/Ti is charged to an 82-gallon stirred reactor containing 40 gallons of odorless mineral spirits. Propylene is pumped into the reactor to 400 psig. and agitation is begun. The polymerization temperature is controlled at 158° C. After 12 hours the polymer solution is filtered to remove the catalyst, concentrated and the polymer extruded and pelletized. A yield of 473 lb. of solid polypropylene having a crystallinity (hexane extraction) of 85 percent and an inherent viscosity (determined in tetralin at 145° C.) of 1.92 is obtained.

Example 6

A solution of 57 g. of aluminum triethyl and 200 ml. n-decane is added to a slurry of 8 g. of lithium hydride and 200 ml. of n-decane. The mixture is heated and stirred at 75° C. for 12 hours in an atmosphere of dry nitrogen to form an organopolylithiumaluminum compound. 1.3 g. of the organopolylithiumaluminum compound is added to 1.5 g. of the alpha form of titanium trichloride to form the catalyst slurry. This slurry is employed to polymerize propylene at 160° C. and 800 psig. 360 g. of solid polypropylene is obtained having a crystallinity of 92 percent and an inherent viscosity (determined in tetralin at 145° C.) of 2.1

Example 7

A solution of 0.29 grams of aluminum triethyl (0.0025 mole) in 16 ml. of heptane was added to 0.04 gram of finely dispersed lithium hydride (0.005 mole) in 50 ml. of mineral spirits. The mixture was stirred for 2 hours at 50° C. under a dry nitrogen atmosphere. An organopolylithiumaluminum compound slurry formed to which was added 0.94 ml. of a 15 percent solution of lithium butyl in hexane (0.0015 mole = 0.096 gram lithium butyl) followed by 0.77 gram of the alpha form of titanium trichloride (0.005 mole) to form a catalyst which contains lithium, aluminum, and titanium at a Li/Al/Ti mole ratio (total) of 0.0065/0.0025/0.005 = 1.3/0.5/1 and an effective mole ratio of 0.55/0.50/1. The catalyst was then charged to a dry 2-liter stirred, stainless steel autoclave containing propylene at 1,000 psig. and 150° C. with 850 ml. of mineral spirits. Propylene pressure was maintained at 1,000 psig. and autoclave temperature at 150° C. The reaction was run for 6 hours. At the end of this time the hot polymer-mineral spirits-catalyst solution was discharged from the autoclave into isopropanol. The catalyst and solvent were then removed by washing the polymer with additional isopropanol. The solid polymer is finally washed with acetone and vacuum dried. A yield of 450 grams of polypropylene was produced having an inherent viscosity (determined at 145° C. in tetralin) of 2.75 and a crystallinity of 93.4 percent (percent nonextractables with n-hexane at reflux).

Example 8

The procedure outlined in Example 7 was repeated except 2.51 ml. of a 15 percent solution of lithium butyl in hexane (0.0040 mole = 0.256 gram lithium butyl) was added to the organopolylithiumaluminum compound slurry produced by the initial reaction between lithium hydride and aluminum triethyl. To this slurry 0.77 grams of the alpha form of titanium trichloride (0.005 mole) was added to form a catalyst which contained lithium, aluminum and titanium at a Li/Al/Ti mole ratio (total) of 0.0090/0.0025/0.0050 = 1.8/0.5/1 and an effective mole ratio of 1.05/0.5/1. The propylene polymerization was carried out as described in Example 1. A yield of 250 grams of polypropylene was obtained having an inherent viscosity of 3.20 and a crystallinity of 92.5 percent (percent nonextractables with n-hexane at reflux).

Example 9

An organopolylithium compound was formed by adding 1.0 gram of aluminum triisobutyl (0.005 mole) to 0.04 gram of lithium hydride (0.005 mole) in 50 ml. mineral spirits and stirring the mixture at 60° C. for 2 hours. To the slurry of this new compound was added 1.26 ml. of a 15 percent solution of lithium butyl in hexane (0.0020 mole = 0.128 gram lithium butyl) followed by a 0.778 gram of an alpha form of titanium trichloride (0.005 mole) to form a catalyst which contains lithium, aluminum, and titanium at an Li/Al/Ti effective mole ratio of 0.00325/0.005/0.005 = 0.65/1.1. The propylene polymerization was then carried out with this catalyst using the same procedure as outlined in Example 7 except that the reaction temperature was 170° C. A yield of 200 grams of polypropylene was obtained having an inherent viscosity of 1.95 as determined in tetralin at 145° C.

Example 10

The procedure outlined in Example 9 was repeated except 2.51 ml. of a 15 percent solution of lithium butyl in hexane (0.0040 mole = 0.256 gram lithium butyl) was added to the organopolylithiumaluminum compound slurry produced by the reaction between lithium hydride and aluminum triisobutyl. The resulting catalyst contained lithium, aluminum and titanium at a Li/Al/Ti mole ratio of 0.00525/0.005/0.005 = 1.05/1/1. Propylene polymerization was carried out using the procedure described in Example 7 except that a reaction temperature of 170° C. was employed. A yield of 150 grams of polypropylene with an inherent viscosity of 2.20 was obtained.

Example 11

The catalyst for this example was prepared as described in Example 5 with the following addition. To the slurry resulting from the reaction of lithium hydride and aluminum triethyl was added (0.32 mole), 20.5 grams of lithium butyl (as a 15 percent solution in hexane). This slurry was charged together with 83 grams of alpha form of titanium trichloride (0.54 mole) to an 82-gallon stirred reactor and propylene polymerized as described in Example 5. A yield of 150 pounds of polypropylene per pound of catalyst was produced having a crystallinity of 85.0 percent (hexane extraction) and an inherent viscosity of 2.54. The Li/Al/Ti mole ratio in this catalyst was:

0.42/0.54/0.54 = effective = 0.80/1/1
0.72/0.54/0.54 = total = 1.3/1/1

A series of 2-liter autoclave propylene polymerizations were made at 160° C. with various lithium-aluminum-titanium based catalyst systems as shown in Table I using the polymerization procedure outlined in Example 7. The catalyst were prepared by adding the proper amount of co-catalyst, containing additive to the alpha form of $TiCl_3$ to give the desired Li/Al/Ti mole ratio. The co-catalysts were prepared in odorless mineral spirits as described in Table I under a nitrogen atmosphere.

Table I clearly shows the equivalence of the following lithium-aluminum-titanium based catalyst systems at the same effective Li/Al/Ti mole ratios and constant polymerization temperature:

1. $(LiH + AlR_3) + TiCl_3$
2. $(LiH + R_2AlH) + TiCl_3$
3. $(LiR + AlR_3) + TiCl_3$
4. $(LiR + R_2AlH) + TiCl_3$
5. $(LiH + AlR_3) + LiR + TiCl_3$
6. $(LiH + R_2AlH) + LiR + TiCl_3$
7. $(LiR + AlR_3) + LiR + TiCl_3$
8. $(LiR + R_2AlH) + LiR + TiCl_3$

These catalysts are equivalent since they give polypropylene with equivalent properties [Hexane Index = percent nonextractables with n-hexane at reflux for 6 hours and molecular weight (I.V.)] and have approximately equivalent polymer/catalyst activities per unit time.

TABLE I

[Autoclave propylene polymerizations at 160° C. with various lithium-aluminum-titanium based catalyst systems]

| | Original components co-catalyst | Mole ratio Li/Al co-catalyst | [1] Mix conditions for original components slurry-MS | Additive | Effective mole ratio Li/Al/Ti in catalyst | Catalyst weight, g. $TiCl_3$ | Activity, g. PP/g. cat. hr. | Percent powder hexane index | I.V. |
|---|---|---|---|---|---|---|---|---|---|
| 1 | LiH/AlEt₃ | 4/1 | 80–90° C., 9 hrs | None | 0.5/0.5/1 | 1.0701 | 20 | 81.5 | 2.35 |
| 2 | LiH/AlEt₃ | 1/1 | 60° C., 2 hrs | LiBu | 0.5/0.5/1 | 0.4577 | 73 | 81.5 | 2.20 |
| 3 | LiH/AlEt₃ | 2/1 | 60° C., 2 hrs | LiBu | 0.6/0.3/1 | 0.6940 | 56 | 81.3 | 2.62 |
| 4 | LiBu/AlEt₃ | 1/1 | 25° C., 1 hr | None | 0.5/0.5/1 | 0.9139 | 50 | 88.3 | 2.34 |
| 5 | LiBu/AlEt₃ | 2/1 | 25° C., 1 hr | do | 1/0.5/1 | 0.3198 | 43 | 85.7 | 2.17 |
| 6 | LiBu/AlEt₃ | 1/1 | 25° C., 1 hr | LiBu | 0.5/0.25/1 | 0.3022 | 40 | 89.5 | 3.08 |
| 7 | LiH/Al(i-Bu)₂H | 1/1 | 100° C., 2 hrs | LiBu | 0.5/0.5/1 | 0.5000 | 75 | 81.4 | 2.12 |
| 8 | LiBu/Al(i-Bu)₂H | 1/1 | 25° C., 1 hr | None | 0.4/0.4/1 | 0.3295 | 65 | 81.5 | 2.10 |
| 9 | LiBu/Al(i-Bu)₂H | 2/1 | 25° C., 1 hr | do | 0.5/0.25/1 | 0.2868 | 41 | 85.0 | 2.64 |
| 10 | LiBu/Al(i-Bu)₂H | 1/1 | 25° C., 1 hr | LiBu | 0.5/0.25/1 | 0.3692 | 51 | 83.1 | 2.48 |
| 11 | LiBu/AlPr₃ | 1/1 | 25° C., 1 hr | None | 0.5/0.5/1 | 0.2741 | 35 | 85.4 | 2.22 |
| 12 | LiBu/AlPr₃ | 2/1 | 25° C., 1 hr | do | 1/0.5/1 | 0.2910 | 28 | 86.5 | 2.32 |
| 13 | LiBu/AlPr₃ | 1/1 | 25° C., 1 hr | LiBu | 0.5/0.25/1 | 0.4542 | 54 | 87.2 | 2.44 |
| 14 | Li i-Pr/AlPr₃ | 1/1 | 25° C., 1 hr | None | 0.5/0.5/1 | 0.2892 | 35 | 78.5 | 1.96 |
| 15 | Li i-Pr/AlPr₃ | 2/1 | 25° C., 1 hr | do | 0.5/0.25/1 | 0.7122 | 45 | 83.6 | 1.96 |
| 16 | Li i-Pr/AlPr₃ | 1/1 | 25° C., 1 hr | LiBu | 0.5/0.25/1 | 0.5128 | 50 | 89.3 | 2.30 |
| 17 | LiBu/AlMe₃ | 2/1 | 25° C., 1 hr | None | 0.6/0.3/1 | 0.5898 | 38 | 84.2 | 2.51 |

[1] The co-catalyst components were mixed in ordorless mineral spirits (MS) at the indicated mole ratio of Li/Al compounds under a nitrogen atmosphere at the indicated temperature for the times shown. Additive was then added.

Example 12

The catalyst for this example was prepared as follows: A organopolylithiumaluminum compound was formed by heating 3.2 grams (0.4 mole) of lithium hydride and 12.3 grams of aluminum triethyl (0.11 mole) in 100 ml. of mineral spirits at 60° C. for 2 hours. To this slurry was added (0.19 mole), 12.2 grams of lithium butyl (as a 15 percent solution in hexane). This slurry was charged together with 83 grams of the alpha form of titanium trichloride (0.54 mole), which constitutes an Li/Al/Ti mole ratio (effective) of 0.29/0.11/0.54 = 0.6/0.2/1 (total = 0.59/0.11/0.54) to an 82-gallon stirred reactor containing 40 gallons of odorless mineral spirits. Propylene was pumped into the reactor to 400 psig. with agitation. The polymerization was controlled at 158° C. After 12 hours reaction time the polymer solution was filtered to remove the catalyst, concentrated, extruded and pelletized. A yield of 450 pounds of solid polymer per pound of catalyst was obtained having a crystallinity (hexane extraction) of 90 percent and an inherent viscosity of 2.65.

Example 13

Example 14

A series of 2-liter autoclave propylene polymerizations were made at 160° C with various lithium-aluminum-titanium based catalyst systems as shown in Table II using the polymerization procedure outlined in Example 7. The catalyst were prepared by adding the proper amount of co-catalyst (containing additive) to the alpha form of $TiCl_3$ to give the desired Li/Al/Ti mole ratio. The co-catalysts were prepared in odorless mineral spirits as described in Table I under a nitrogen atmosphere.

Table II shows the equivalence of the following lithiumaluminum-titanium based catalyst systems at the same effective Li/Al/Ti mole ratios and constant polymerization temperature:

1. $(LiH + AlR_3) + AlR_3 + TiCl_3$
2. $(LiH + R_2AlH) + AlR_3 + TiCl_3$
3. $(LiH + AlR_3) + AlR_2H + TiCl_3$
4. $(LiH + R_2AlH) + R_2AlH + TiCl_3$
5. $(LiR + AlR_3) + AlR_3 + TiCl_3$
6. $(LiR + AlR_3) + AlR_2H + TiCl_3$
7. $(LiR + AlR_2H) + AlR_2H + TiCl_3$

8. $(LiR + AlR_2H) + AlR_3 + TiCl_3$

Figure 1:
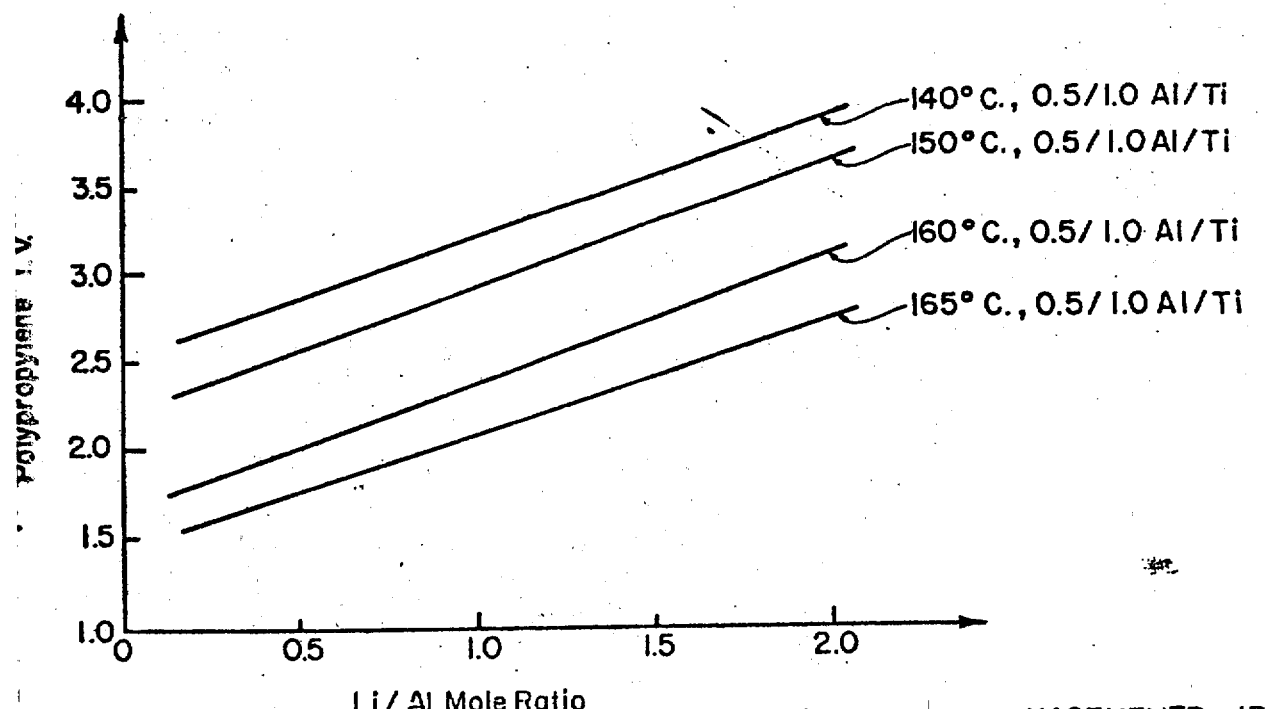

These catalysts are equivalent for the same reasons as outlined in Example 13. It should be noted here that the lower Li/Al ratios in these co-catalysts result in a lower crystallinity and lower I.V. polypropylene than is obtained with co-catalysts having a higher Li/Al ratio. Compare Table II (Li/Al = 0.5/1) and Table I (Li/Al = 1–2/1).

described above. These cocatalyst mixtures were then used in combination with $TiCl_3$ to polymerize propylene continuously in the 82-gallon reactor at various temperatures. The relationships found between polypropylene molecular weight (I.V.) and the Li/Al mole ratio in the cocatalyst at various temperatures is shown in FIG. 1. The relationship found between polypropylene crystallinity (percent hexane nonextractables

TABLE II

[Autoclave propylene polymerizations at 160° C. with various lithium-aluminum-titanium based catalyst systems]

| | Original components co-catalyst | Mole ratio Li/Al co-catalyst | Mix conditions for original slurry components | Additive | Effective mole ratio Li/Al/Ti in catalyst | Activity g./PP/g. cat./hr. | Percent powder hexane index | I.V. |
|---|---|---|---|---|---|---|---|---|
| 1 | LiH/AlEt$_3$ | 3/1 | 80–90° C., 9 hrs | AlEt$_3$ | 0.25/0.5/1 | 55 | 77.2 | 1.61 |
| 2 | LiH/AlEt$_3$ | 4/1 | 60° C., 2 hrs | Al(i-Bu)$_2$H | 0.25/0.5/1 | 50 | 73.1 | 1.59 |
| 3 | LiH/Al(i-Bu)$_2$H | 3/1 | 100° C., 12 hrs | AlEt$_3$ | 0.25/0.5/1 | 46 | 74.3 | 1.72 |
| 4 | LiH/Al(i-Bu)$_2$H | 3/1 | 100° C., 12 hrs | Al(i-Bu)$_2$H | 0.25/0.5/1 | 56 | 75.2 | 1.65 |
| 5 | LiBu/AlEt$_3$ | 1/1 | 25° C., 1 hr | AlEt$_3$ | 0.25/0.5/1 | 42 | 83.5 | 2.01 |
| 6 | LiBu/AlEt$_3$ | 2/1 | 25° C., 1 hr | Al(i-Bu)$_2$H | 0.25/0.5/1 | 38 | 79.2 | 1.94 |
| 7 | LiBu/Al(i-Bu)$_2$H | 1/1 | 25° C., 1 hr | AlEt$_3$ | 0.25/0.5/1 | 40 | 80.2 | 1.85 |
| 8 | LiBu/Al(i-Bu)$_2$H | 2/1 | 25° C., 1 hr | Al(i-Bu)$_2$H | 0.25/0.5/1 | 45 | 76.4 | 1.71 |
| 9 | LiBu/AlPr$_3$ | 1/1 | 25° C., 1 hr | AlEt$_3$ | 0.25/0.5/1 | 53 | 79.8 | 1.63 |
| 10 | LiPr/AlPr$_3$ | 1/1 | 25° C., 1 hr | AlEt$_3$ | 0.25/0.5/1 | 30 | 77.3 | 1.75 |

Example 15

An organopolylithium compound was formed by adding 0.58 grams (0.005 mole) of aluminum triethyl (3.2 ml. of a 25 percent solution in heptane) to 3.14 ml. of a 15 percent solution of lithium butyl in hexane (0.005 mole = 0.32 gram lithium butyl) in 100 ml. of mineral spirits and stirring the mixture at 25° C. for 1 hour. The resulting flocculent solid was filtered, washed three times with 100 ml. portions of dry n-pentane, and vacuum dried. The organopolylithiumaluminum compound is isolated and is referred to as Solid A in Table III.

A series of 2-liter autoclave propylene polymerizations were made at 160° C. with Solid A plus various additives to control polypropylene crystallinity and molecular weight (I.V.) as shown in Table III. The polymerization procedure outlined in Example 7 was used. These runs show that the same results are obtained by separating the solid organopolylithiumaluminum compound and adding back lithium alkyl or aluminum alkyl and/or dialkyl aluminum hydride as when the total slurry of Solid A as described in Example 13 (Run 6) and Example 14 (Runs 5 and 6) is used.

at hexane reflux) and the Li/Al mole ratio in the cocatalyst at 160° C. is shown in FIG. 2.

Example 17

A solid slurry of organopolylithiumaluminum compound was prepared as follows: 456 grams (4 mole) of aluminum triethyl in solution in 2,500 ml. of heptane was added to 5 gallons of dry odorless mineral spirits under a nitrogen atmosphere. 512 grams of lithium butyl (8 mole) was then added in 6,280 ml. of hexane with stirring at 25° C. The resulting white solid slurry contained lithium and aluminum at a ratio of Li/Al = 2/1. This slurry was then fed (138.5 ml./hour = 0.02 mole Al/hour) with an alpha form of titanium trichloride (12 grams/hour = 0.08 mole/hour) to an 82-gallon stirred autoclave to make polypropylene continuously at 160° C. in mineral spirits solvent at 400 psig. propylene pressure. Hydrogen was fed at various flow rates to the reactor to control the polypropylene I.V. The polypropylene was recovered from solution as described in Example 5 on a continuous basis. The relationship between the polypropylene I.V. and the standard cubic feet of hydrogen fed per pound total polypropylene

TABLE III

[Autoclave propylene polymerizations at 160° C. with solid organopolylithium-aluminum Compound A+ additive+TiCl$_3$ catalyst]

| Run Number | Solid co-catalyst A | Additive | TiCl$_3$, wt., g. | Effective mole ratio, Li/Al/Ti in catalyst | Activity, g. PP/g. cat./hr. | Percent powder hexane index | I.V. |
|---|---|---|---|---|---|---|---|
| 1 | (LiBu+AlEt$_3$) | None | 0.5381 | 1/0.5/1 | 43 | 87.3 | 2.37 |
| 2 | (LiBu+AlEt$_3$) | LiBu | 0.4218 | 0.6/0.2/1 | 20 | 89.1 | 2.56 |
| 3 | (LiBu+AlEt$_3$) | AlEt$_3$ | 0.5611 | 0.5/0.5/1 | 48 | 85.2 | 2.34 |
| 4 | (LiBu+AlEt$_3$) | Al(i-Bu)$_2$H | 0.7680 | 0.5/0.5/1 | 52 | 86.8 | 2.20 |

Example 16

Figure 3:
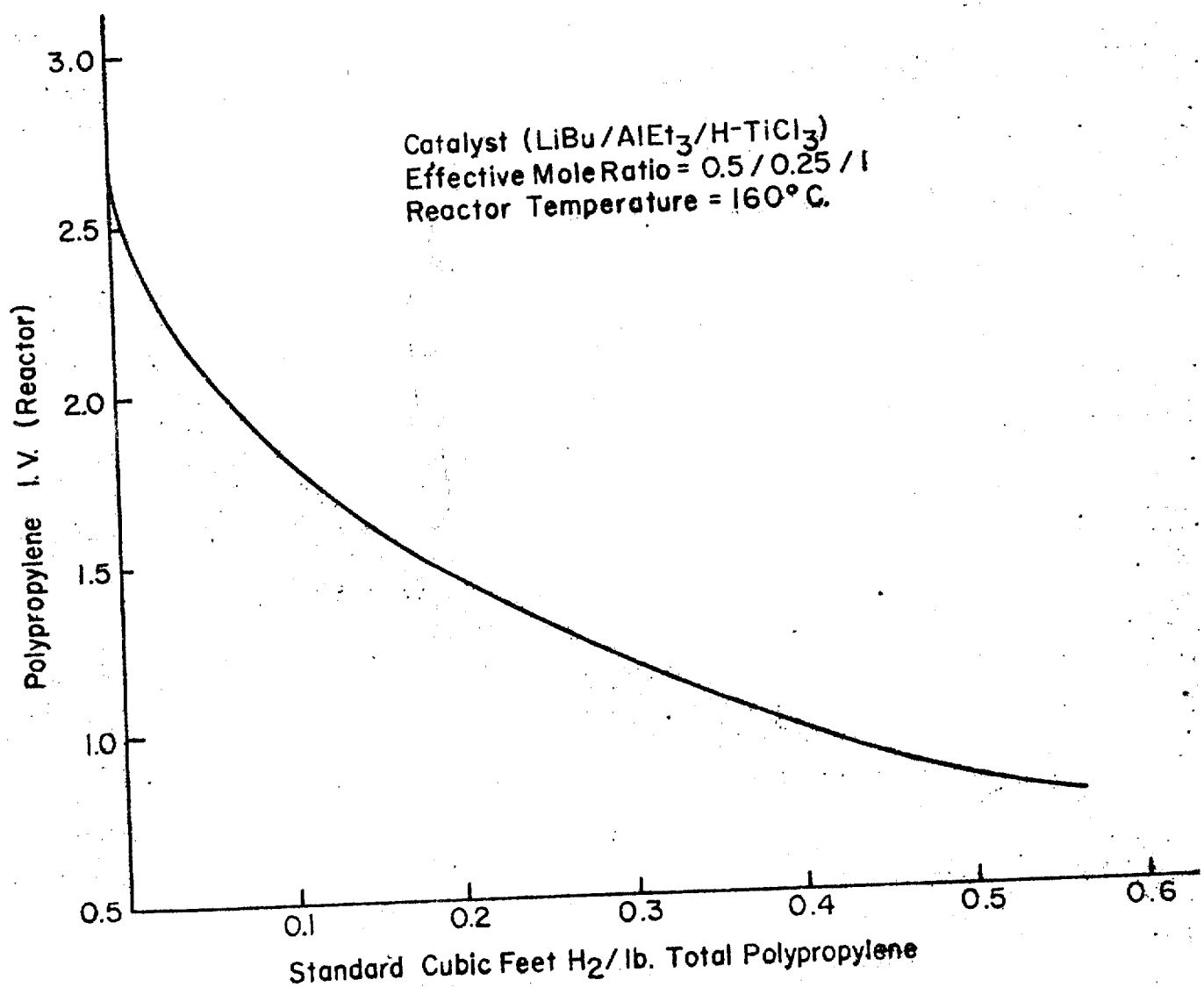

Several solids slurries of organopolylithiumaluminum compounds were prepared as follows: 4.56 grams (0.04 mole) of aluminum triethyl (25 ml. of a 25 percent solution in heptane) was added to 1,000 ml. of mineral spirits. A 15 percent solution of lithium butyl in hexane (31.4 ml.) (0.04 mole = 2.56 grams lithium butyl) was added with stirring under a nitrogen atmosphere at 25° C. The resulting solid slurry contained lithium and aluminum at a ratio Li/Al of 1/1. This slurry was used in combination with the alpha form of titanium trichloride (12 grams/hour = 0.08 mole/hour) to make polypropylene continuously at various conditions of temperature in an 82-gallon stirred autoclave with mineral spirits solvent at 400 psig. $C_3H_6$ pressure. The polypropylene was recovered from solution as described in Example 5 on a continuous basis. Various mole ratios of Li/Al in the cocatalyst slurry were prepared by adding adding appropriate equivalents of either lithium butyl (Li/Al>1) or aluminum triethyl (Li/Al<1) to the solid slurries made is shown in FIG. 3. No change in polypropylene crystallinity was noted with the change or control of polymer molecular weight (I.V.).

Example 18

The catalyst for this example was prepared as outlined in Example 12. The solid co-catalyst slurry of organopolylithiumaluminum compound was charged together with 83 grams of the alpha form of titanium trichloride (0.54 mole) which constitutes an Li/Al/Ti mole ratio of 0.5/0.2/1 to an 82-gallon stirred reactor containing 40 gallons of odorless mineral spirits. Propylene was pumped into the reactor to 400 psig. with agitation. The polymerization was controlled at 160° C. After 12 hours reaction time, the reactor pressure was allowed to fall to 200 psig. The percent solids in the reactor was 25 percent. Ethylene was then pressured into the reactor to 400 psig. total pressure and the reaction continued until the percent solids reached 30 percent. The polymer solution was then diluted to 10 percent solids, filtered to remove catalyst residues, concentrated to 20 percent volatiles, extruded and pelletized. A yield of 500 pounds of solid polymer per pound of catalyst was obtained. The polyallomer had an I.V. of 2.40, a hexane index of 85 percent and an ethylene content (hexane extracted) of 6 weight percent. The polyallomer after hexane extraction exhibited low temperature properties and impact strength as shown by the following table of physical properties.

| Property | Polyallomer |
|---|---|
| Brittleness Temp., °C. (ASTM D–746) | −26 |
| Tensile Strength (ASTM D 638) | |
| At Fracture | 2480 |
| At Yield | 3640 |
| Elongation | 436 |
| Stiffness, psi. (ASTM D 747) | $1.18 \times 10^5$ |
| Vicat Soft. Pt., °C. (ASTM D 1525) | 129 |
| Hardness, Rockwell (ASTM D–785) | 65 |
| Tensile Impact | 67 |
| Notched Izod at 23°C. (ASTM D 256) | Partial Break |
| Unnotched Izod at 23° C. (ASTM D 256) | No Break |
| Ethylene | 6.0 |
| I.V. | 2.40 |
| Hexane Index | 85 |

Example 19

Several 2-liter autoclave runs were made with the catalyst shown in the table below for polymerization of propylene at 160° C. The procedure used for making these autoclave runs is described in Example 15. This data shows that the $LiH$-$TiCl_3$ and $LiR$-$TiCl_3$ catalyst systems does not polymerize propylene at high temperature and that the $AlR_3$-$TiCl_3$ catalyst makes very low molecular weight and low crystallinity (percent hexane nonextractables at reflux) polypropylene.

Autoclave $C_3H_6$ Polymerizations
160° C., 1000 psig. $C_3H_6$, 6 hour

| Run No. | Co-catalyst | Wt., g. | Cata-lystg. | Wt., | Mole Ratio (Co-cat./Cat.) | g. Yield | % Cryst. | IV |
|---|---|---|---|---|---|---|---|---|
| 1 | LiH | 0.039 | $TiCl_3$ | 0.75 | 1/1 | 0 | - | - |
| 2 | LiH | 0.156 | $TiCl_3$ | 0.75 | 4/1 | 0 | - | - |
| 3 | LiBu | 0.310 | $TiCl_3$ | 0.75 | 1/1 | 0 | - | - |
| 4 | LiBu | 1.240 | $TiCl_3$ | 0.75 | 4/1 | 0 | - | - |
| 5 | $AlEt_3$ | 0.278 | $TiCl_3$ | 0.75 | 0.5/1 | 350 | 52 | 0.75 |
| 6 | $AlEt_3$ | 0.556 | $TiCl_3$ | 0.75 | 1/1 | 250 | 61 | 0.92 |

It would, therefore, not be expected that the organopolylithiumaluminum compound formed by reaction of LiH with $AlEt_3$ should be such as excellent high-temperature catalyst for polypropylene.

Thus, at high temperatures a two-component mixture comprising lithium hydride or lithium alkyl with the alpha form of titanium trichloride, is not an effective catalyst to form solid, highly crystalline polymers from alpha-olefins containing at least three carbon atoms at temperatures above 140° C. An aluminum trialkyl such as triethyl aluminum and the alpha form of titanium trichloride is an active catalyst at high temperatures, such as 155° C., but rapidly decomposes and is inactive. Furthermore, polypropylene prepared with this catalyst at high temperatures is of low yield and has a low inherent viscosity, such as about 0.8, and a low hexane index of about 59 percent. In contrast, the organopolylithiumaluminum compound formed from lithium butyl and triethyl aluminum, when employed with the alpha form of titanium trichloride in a mole ratio of lithium to aluminum of 2:1 and a molar ratio of aluminum to titanium of 0.5:1, according to this invention, is extremely effective as catalyst in processes run at temperatures of 160° C. in forming solid, high molecular weight, high crystalline polymers having an inherent viscosity of about 2.4 and a hexane index of about 88 from alpha-olefins containing at least three carbon atoms.

By adding lithium butyl, a noncatalyst, to this catalyst mixture, the inherent viscosity is increased to 2.7 and the hexane index is increased to 92 percent. By the practice of this invention, there is provided to the art a high temperature polymerization process employing a very specific catalyst mixture that can be used to form solid, high molecular weight, highly crystalline polymers from alpha-olefins containing at least three carbon atoms. The components of the catalyst mixture are readily available materials and are easily handled in commercial operation which makes the process disclosed herein readily adaptable to commercial-scale production.

The polymers that are obtained in accordance with the practice of this invention can be used for forming films, molded articles, coated articles and the like and can be blended with other resinous or elastomeric materials or compounded with pigments, dyes, filters, stabilizers and the like. The process of this invention is applicable to forming copolymers from alpha-olefins containing at least three carbon atoms and a variety of products can be obtained by varying the relative proportion of the components in the mixtures of monomers being polymerized.

Although the invention has been described in considerable detail with reference to certain preferred embodiments thereof, it will be understood that variations and modifications can be affected without departing from the spirit and scope of the invention as described hereinabove and as defined in the appended claims.

We claim:

1. A solution process for polymerizing alpha-olefins containing at least three carbon atoms and mixtures of alpha-olefins containing at least three carbon atoms with ethylene to solid, high molecular weight polymer having a crystallinity of at least 70 percent which comprises contacting said alpha-olefin, at a temperature in the range of about 140 to about 300° C. and a pressure in the range of about atmospheric to about 2,000 atmospheres, with a catalyst mixture comprising (1) an organopolylithiumaluminum compound prepared by reacting lithium alkyl with at least one aluminum compound selected from the group consisting of aluminum trialkyl and dialkyl aluminum hydride, (2) an alkyl compound selected from the group consisting of lithium alkyl, aluminum trialkyl and dialkyl aluminum hydride and (3) the alpha form of titanium trichloride wherein the ratio of lithium to aluminum in the catalyst mixture is 0.25:1 to 4:1, the ratio of aluminum to titanium in the catalyst mixture is 0.1:1 to 1:1, and the ratio of lithium to titanium is 0.25:1 to 1:1.

2. The process of claim 1 wherein said solid organopolylithiumaluminum compound is the reaction product of lithium alkyl and aluminum trialkyl.

3. The process of claim 2 wherein each alkyl radical of said aluminum trialkyl contains one to 12 carbon atoms.

4. The process according to claim 3 wherein said aluminum trialkyl is triethyl aluminum.

5. The process of claim 4 wherein said lithium alkyl is lithium butyl.

6. The process of claim 5 wherein said alkyl compound is lithium alkyl.

7. The process of claim 1 wherein said lithium alkyl is lithium butyl.

8. The process of claim 7 wherein propylene is polymerized to highly crystallizable polypropylene.

9. The process of claim 7 wherein propylene and ethylene are polymerized to form an ethylene/propylene block copolymer containing both crystallizable polymerized propylene segments and crystallizable polymerized ethylene segments.

10. The process of claim 1 wherein said organopolylithiumaluminum compound is the reaction product of lithium alkyl and dialkyl aluminum hydride.

11. The process of claim 10 wherein each alkyl radical of the dialkyl aluminum hydride contains one to 12 carbon atoms.

12. The process according to claim 11 wherein said dialkyl aluminum hydride is diisobutyl aluminum hydride.

13. The process of claim 12 wherein said alkyl compound is lithium alkyl.

14. The process of claim 12 wherein said alkyl compound is aluminum trialkyl.

15. The process of claim 12 wherein said alkyl compound is dialkyl aluminum hydride.

* * * * *

PO-1050
(5/69)

UNITED STATES PATENT OFFICE
CERTIFICATE OF CORRECTION

Patent No. 3,679,775      Dated July 25, 1972

Inventor(s) Hugh J. Hagemeyer, Jr. and Vernon K. Park

It is certified that error appears in the above-identified patent and that said Letters Patent are hereby corrected as shown below:

In the abstract, line 2, delete "organopolylithiumalum-aluminum" and insert ---organopolylithiumaluminum---.

Column 1, line 13, delete "a" and insert ---is---.

Column 2, line 37, delete "catalystic" and insert ---catalytic---.

Column 4, line 28, delete "organopolylithiumaliminum" and insert ---organopolylithiumaluminum---.

Column 5, line 9, delete "organopolylithiumaliminum" and insert ---organopolylithiumaluminum---.

Column 5, lines 25 and 26, delete

"$\dfrac{\text{Moles LiH'4} + \text{Moles LiR}}{\text{Moles AlR}_3 \text{ and'or moles R}_2\text{AlH}}$" and insert ---$\dfrac{\text{Moles LiH/4} + \text{Moles LiR}}{\text{Moles AlR}_3 \text{ and/or moles R}_2\text{AlH}}$---.

Column 7, line 8, delete "4-methyl-1-hexane" and insert ---4-methyl-1-hexene---.

Column 14, line 54, claim 7, "1" should be ---6---.

Patent No. 3,679,775

On the cover sheet after the "abstract", "15 Claims, No Drawings" should read -- 15 Claims, 3 Drawing Figures -- . The attached two sheets of drawings containing Figures 1-3 should be added.

Signed and sealed this 22nd day of January 1974.

(SEAL)
Attest:

EDWARD M. FLETCHER, JR.
Attesting Officer

RENE D. TEGTMEYER
Acting Commissioner of Patent